United States Patent [19]

Uberbacher

[11] 4,198,119
[45] Apr. 15, 1980

[54] CONNECTOR FOR OPTICAL CABLE

[75] Inventor: Edward C. Uberbacher, Raleigh, N.C.

[73] Assignee: International Business Machines Corporation, Armonk, N.Y.

[21] Appl. No.: 942,084

[22] Filed: Sep. 13, 1978

[51] Int. Cl.² .............................................. G02B 5/14
[52] U.S. Cl. ............................... 350/96.20; 350/96.21
[58] Field of Search ................. 350/96.20, 96.21, 96.22

[56] References Cited

U.S. PATENT DOCUMENTS

| 3,861,781 | 1/1975 | Hasegawa et al. | 350/96.21 |
| 4,119,363 | 10/1978 | Camlibel et al. | 350/96.20 |
| 4,124,364 | 11/1978 | Dalgoutte | 350/96.21 |

FOREIGN PATENT DOCUMENTS 2312791 12/1976 France .................... 350/96.21

OTHER PUBLICATIONS

I. S. Fews, "Instrument for Testing Telecommunications Optical Fibres", *Optical Engineering,* vol. 15, No. 3, May–Jun., 1976.

*Primary Examiner*—Stewart J. Levy
*Attorney, Agent, or Firm*—Gerald R. Woods

[57] ABSTRACT

A connector assembly for an optical cable, consisting of an optical fiber and a protective jacket, includes a connector body with an opening therethrough. The opening consists of two coaxial bores of different sizes. A sleeve assembly located within the larger bore includes an outer heat-shrinkable sleeve and a concentric, inner sleeve of meltable filler material. A length of optical fiber from which the protective jacket has been stripped is inserted through the sleeve assembly and through the second, smaller bore in the connector body. Heat is applied to the connector assembly. The shrinking outer sleeve forces melting filler material into the smaller bore to lock the fiber in place. The connector body is also secured to the protective jacket of the optical cable to relieve strain on the optical fiber.

13 Claims, 2 Drawing Figures

CONNECTOR FOR OPTICAL CABLE

TECHNICAL FIELD

The present invention relates to optical cables and more particularly to a connector assembly for an optical cable comprising an optical fiber and a protective jacket.

It has been established that optical fibers can be used to transmit digital data at rates far exceeding those possible with the electrical conductors of the same general size. For that reason, there has been a great deal of interest in developing optical data busses for use in electronic data processing systems.

One of the obstacles to the practical use of optical fibers as data busses is that such fibers are brittle and easily broken. Additionally, it is considerably more difficult to connect optical fibers to provide a continuous data path than it is to connect metallic electrical conductors. Misalignment of the optical fibers can result in degradation of the optical signal as well as crosstalk or unintentional transfer of a signal to an adjacent optical channel. Obviously, signal degradation and cross-talk will adversely affect the integrity of data transmitted through such a cable.

To protect the ends of optical fibers and to permit fibers to be more accurately connected, connectors have been developed which are secured to the ends of the optical fiber. Known connectors are generally more complex, more expensive and less reliable than desired.

SUMMARY

The present invention is a simple, highly effective connector assembly which is used to protect the end of a cable consisting of a thread-like energy conductor having a protective jacket. The jacket is initially stripped from a short length of conductor.

The connector assembly includes a connector body having an opening therethrough for receiving the stripped end of the cable. The opening includes a first bore and a second, relatively smaller bore coaxial with the first bore. An annular heat-shrinkable sleeve is received in the first bore. A second annular sleeve of meltable filler material is located within the heat-shrinkable sleeve. The connector assembly is heated after assembly to shrink the heat-shrinkable sleeve as the filler material begins to melt. The shrinking sleeve forces the melting filler material into the second, smaller bore to lock the optical fiber in place in the second bore.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

DETAILED DESCRIPTION

Figure 1:
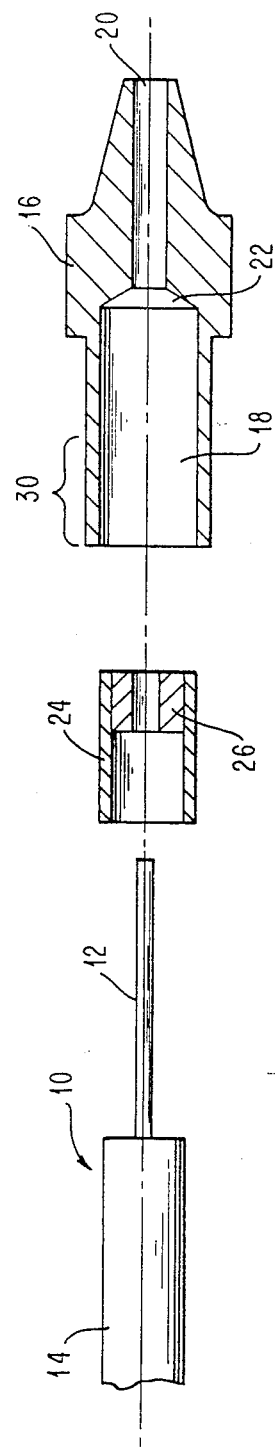
FIG. 1 is an exploded cross-sectional view of a connector assembly incorporating the present invention prior to attachment.

Referring to FIG. 1, an optical cable 10 includes a central light conducting or optical fiber 12 and a surrounding protective jacket 14, preferably made from a suitable plastic material. Before attaching a connector assembly to this cable, a short length of the protective jacket 14 is stripped from one end of the cable 10 using any suitable conventional stripper such as a hot wire stripper. A hot wire stripper is basically a length of heated wire which is brought into contact with the protective jacket 14 to melt at least part of the jacket so that it can be pulled from the end of the cable. The use of a hot wire stripper is preferred since conventional metallic wire strippers can damage the glass fiber and make it far more susceptible to breakage.

The connector assembly includes a connector body 16 with an opening extending completely therethrough. The opening consists of a first, relatively large bore 18 and a second, relatively smaller bore 20 which is coaxial with the first bore 18. The bores 18 and 20 are connected by a transition area defined by an inwardly beveled shoulder 22.

The connector assembly further includes a sleeve assembly consisting of a cylindrical outer sleeve 24 made from a heat-shrinkable material and a cylindrical inner sleeve 26 made from a meltable filler material. The heat-shrinkable material may be conventional. One example of suitable material is a cross-linked, stabilized, modified polyvinyl chloride material made and sold as RT-800 tubing by Raychem Corporation of Menlo Park, CA. The filler material may be conventional metal solder or any other material which melts when heated and hardens when cooled to ambient. For example, a hot melt adhesive may be used as a filler material. The melting point of the filler material should be slightly greater than the shrink temperature of sleeve 24. The initial outer diameter of the heat-shrinkable sleeve 24 is preferably slightly less than the inner diameter of the first bore 18 of the connector body 16, permitting the sleeve assembly to be readily loaded into bore 18.

In fabricating the connector assembly, the sleeve assembly is first loaded into the bore 18. The stripped end of the cable 10 is then inserted into the bore 18 with the fiber 12 extending through the second bore 20 to at least the outer end of the bore. Preferably, the initial inside diameter of the heat-shrinkable sleeve 24 is somewhat less than the outside diameter of the cable jacket 14 so that the jacket cannot be forced beyond the end of the heat-shrinkable sleeve 24.

Figure 2:
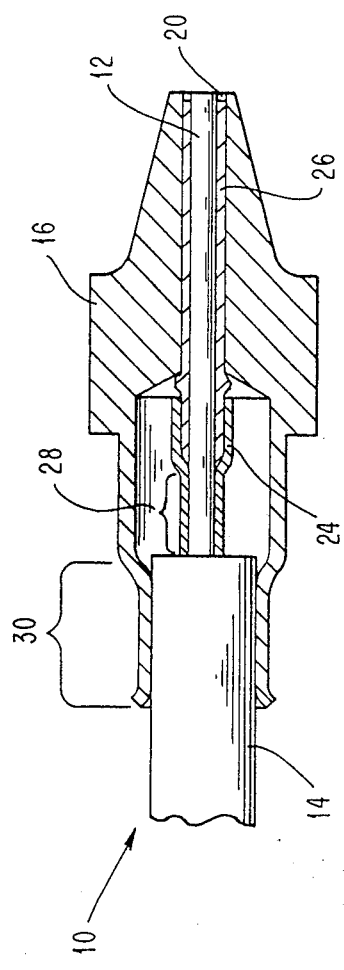
FIG. 2 is a cross-sectional view of a completed connector assembly.

The connector is then heated to shrink the sleeve 24 while melting the filler material. Referring to FIG. 2, the sleeve 24 will shrink into contact with the optical fiber 12 in a region 28. As the sleeve 24 shrinks, the melting filler material is forced into the second bore 20 to fill the space 26 between the outer surface of optical fiber 12 and the inner diameter of the bore 20. When the filler material hardens, it serves both to protect the fiber and to hold it in position within the connector body 16.

Added strain relief may be provided by deforming cylindrical wall section 30 of connector body 16 into engagement with the protective jacket 14. Depending upon the type of material from which the connector body 16 is made, section 30 can be deformed by the application of heat and/or pressure.

While the invention has been described as a connector assembly for an optical fiber cable, the same connector assembly and fabrication techniques could be used to provide a connector for braided or solid metal wire.

While there has been described what is considered to be a preferred embodiment of the present invention, variations and modifications therein will occur to those skilled in the art once they become acquainted with the basic concepts of the invention. It is intended that the appended claims shall be construed to include the preferred embodiment, the alternate use described above and all variations and modifications that fall within the true spirit and scope of the invention.

Having thus described my invention, what I claim as new, and desire to secure by Letters Patent is:

1. A connector assembly for a cable comprising a thread-like energy conductor surrounded by a protective jacket, the jacket being stripped from the conductor adjacent one end, said assembly comprising:
   a connector body having an opening therethrough for receiving the stripped end of the cable, the opening comprising a first bore and a second, relatively smaller bore coaxial with the first bore;
   a cylindrical heat-shrinkable sleeve received within the first bore; and
   a cylindrical sleeve of filler material received within the heat-shrinkable sleeve,
   said heat-shrinkable sleeve and said filler material sleeve surrounding and being in intimate contact with the energy conductor with at least part of said filler material extending into the second bore.

2. A connector assembly as defined in claim 1 wherein a portion of the protective jacket is received within the first bore of said connector body, said connector body being in contact with the protective jacket.

3. A connector assembly as defined in claim 1 wherein said thread-like energy conductor is an optical fiber.

4. A connector assembly as defined in claim 2 wherein said thread-like energy conductor is an optical fiber.

5. A connector assembly as defined in claim 4 wherein the filler material extends the length of the second bore.

6. A connector assembly as defined in claim 5 wherein said optical fiber and the surrounding filler material completely fill the second bore over a substantial portion of the bore length.

7. A connector assembly as defined in claim 6 wherein said heat-shrinkable sleeve is made from a polyvinyl chloride material.

8. A kit for forming a connector assembly for an optical fiber having a surrounding protective jacket comprising:
   a connector body having an opening therethrough for receiving the optical fiber, the opening comprising a first bore capable of receiving the fiber and surrounding protective jacket and a second coaxial bore capable of receiving only a length of optical fiber from which the jacket has been stripped;
   a cylindrical heat-shrinkable sleeve adapted to be received within the first bore;
   a cylindrical sleeve of meltable filler material adapted to be received within said heat-shrinkable sleeve;
   the fiber extending through said filler material sleeve in the finished connector assembly.

9. A kit as defined in claim 8 wherein said cylindrical heat-shrinkable sleeve is made from a polyvinyl chloride material.

10. A kit as defined in claim 9 wherein said connector body is made from a material which can be deformed upon application of heat and/or pressure.

11. A kit as defined in claim 10 wherein the outside diameter of said heat-shrinkable sleeve is initially equal to or slightly less than the inside diameter of the first bore in said connector body.

12. A method for securing an optical fiber having a surrounding jacket to a connector body having an opening therethrough formed by a first bore and a second relatively smaller bore coaxial with the first bore where the surrounding jacket is stripped from the fiber adjacent one end thereof, said method comprising the steps of:
   inserting a sleeve assembly into the first bore, the sleeve assembly comprising a cylindrical outer sleeve of heat-shrinkable material and cylindrical inner sleeve of meltable filler material;
   inserting the stripped end of the fiber into said connector body until the end of the jacket abuts the end of the sleeve assembly, the stripped length of optical fiber being sufficient to extend the length of the second bore;
   applying a sufficient amount of heat to the connector body and sleeve assembly to shrink the heat-shrinkable sleeve into contact with the optical fiber while melting the filler material,
   allowing the filler material to flow into the second bore to surround and secure the optical fiber within the second bore.

13. A method as defined in claim 12 further including the step of deforming a portion of the connector body into surrounding contact with the jacket of said optical cable to provide strain relief for the optical fiber.

* * * * *